(12) United States Patent
Hayden

(10) Patent No.: US 6,409,882 B1
(45) Date of Patent: Jun. 25, 2002

(54) TALL OIL REFINING IMPROVEMENT

(75) Inventor: J. George Hayden, Isle of Palms, SC (US)

(73) Assignee: Westvaco Corporation, New York, NY (US)

( * ) Notice: Subject to any disclaimer, the term of this patent is extended or adjusted under 35 U.S.C. 154(b) by 0 days.

(21) Appl. No.: 09/427,127

(22) Filed: Oct. 22, 1999

(51) Int. Cl.[7] ............................................. D21C 11/06

(52) U.S. Cl. ............................ 162/14; 162/16; 162/61

(58) Field of Search .......................... 162/14, 15, 16, 162/49, 61

(56) References Cited

U.S. PATENT DOCUMENTS 5,976,323 A * 11/1999 Milde et al. .................. 203/2

* cited by examiner

Primary Examiner—Dean T. Nguyen
(74) Attorney, Agent, or Firm—Terry B. McDaniel; Daniel B. Reece, IV; Richard L. Schmalz

(57) ABSTRACT

In a tall oil refining operating plant, a warm water loop is disclosed for cooling the tall oil heads fraction extracted from the crude tall oil, rather than the conventional use of cold water. This avoids condensation and the subsequent solidification of athraquinone pulping aid remaining in the crude tall oil; thus, avoiding fouling of the cooling towers. The temperature of the warm-water is controlled automatically by tempering the cold water entering the warm water "cooling" loop, while removing excessively warm water from said loop to the cooling tower system, as needed.

7 Claims, 2 Drawing Sheets

TALL OIL REFINING IMPROVEMENT

BACKGROUND OF THE INVENTION

1. Field of the Invention

The present invention relates to converting wood pulping process black liquor soap skimmings to crude tall oil (CTO) and refining the crude tall oil for separation of the tall oil fatty acids and tall oil resin acids contained therein. More particularly, the present invention relates to improvements in tall oil refining to avoid fouling the refinery heads loop coolers and causing a significant loss in heat transfer.

2. Description of Related Art (Including Information Disclosed Under 37 CFR 1.97 and 37 CFR 1.98)

It has long been appreciated that the black liquor residue from wood pulping contains valuable chemicals, which make up the CTO and have various industrial applications. The black liquor contains the soaps of rosin and fatty acids, as well as sodium lignate and the spent cooking chemicals for reuse. On concentration of the spent pulping liquor, the sodium soap of these mixed acids rise to the surface and can be skimmed off. This material is referred to as "soap skimmings" or "tall oil soap." The soap skimmings are converted to CTO by reaction typically with sulfuric acid and then separated from the simultaneously formed spent acid by batch cooking, continuous centrifuging, or continuous decanting. The CTO is normally divided into various fractions by distillation, which first extracts the pitch fraction. The de-pitched CTO is then separated into fractions of heads, tall oil rosin (TOR), tall oil fatty acids (TOFA), and distilled tall oil (DTO).

In the period since Hutch Holton disclosed in U.S. Pat. No. 4,012,280 that anthraquinone can be beneficially employed as a pulping aid to increase pulp yield, the use of anthraquinone in this application has grown. While its use is beneficial to pulp yield, some of the chemical ends up in the black liquor soap skimmings and, consequently, in the CTO. When the CTO is refined, the anthraquinone will condense in the upper cooling zones of the refinery towers, as well as in external heat exchangers and in the vacuum system. Such condensation reduces the efficiency of the refining operation by loss in heat transfer capability and eventually requires cleaning of the towers.

One solution proposed for this problem is described in commonly-owned pending U.S. patent application Ser. No. 09/390,153, now abandoned. A means was disclosed for modifying the conventional tall oil refinery to avoid fouling of the cooling zones of the towers and associated heat exchangers by employing a warm water loop for cooling the tall oil heads fraction extracted from the crude tall oil, rather than using cold water. This ('153) solution reduced or eliminated the anthraquinone condensation and subsequent solidification and crystallization in heads loop direct contact coolers and associated heat exchangers. Unfortunately, the problem with anthraquinone condensation in the tall oil distillation process is more pervasive, and said solution provides only limited benefits.

In view of the various types of condensation equipment available, including indirect contact type coolers, as well as the various temperature ranges existing in the tall oil distillation columns themselves, there remains an anthraquinone condensation and solidification problem unsolved. Therefore, a further means is needed to deal with the anthraquinone-induced equipment fouling associated with tall oil distillation.

SUMMARY OF THE INVENTION

The object of the invention is met in the refining plant flow diagram disclosed herein. In particular, the invention provides a process for avoiding anthraquinone condensation and solidification in a tall oil distillation column with an indirect contact condenser connected in series with the column. A warm-water loop is provided for the tube-side flow of tempered water to prevent anthraquinone from fouling the outer surfaces of the exchanger tubes and causing a loss in heat transfer and increased pressure drop.

DESCRIPTION OF THE PREFERRED EMBODIMENT(S)

The present invention is pertinent to a method and apparatus for continuous fractionation of tall oil and similar mixtures of organic substances containing components prone to react upon heating. One or more fractionating columns are utilized to separate the mixture into at least two main fractions, for example, a rosin acid fraction and a fatty acid fraction with a pre-treating device comprising an evaporator, a fractionating column and a condenser. The evaporator of the pre-treating device and the evaporator which precedes the first fractionating column can both be thin film evaporators, whereby evaporation occurs so quickly as to minimize reaction upon heating. Preferably, a pair of fractionating columns are utilized, the first serving as a rosin acid distilling column and the second serving as a fatty acid distilling column, with the bottoms from the first fractionating column being recycled to the evaporator which precedes the first fractionating column to subject the same to further evaporation and fractionation.

The present invention provides an improved process for use with indirect contact condensers, where the condensing and cooling zone for the tall oil distillation column consist of an internal tube bundle. Such internal tube bundles with which the invention is applicable are those as described in U.S. Pat. No. 3,644,179 to Knoer et al. and others similar thereto. In such indirect contact condensers, the tall oil vapors and noncondensible gases pass over the outer surfaces of a tube bundle that is within the column shell or is within a separate exchanger connected directly to the column so that, in effect, it becomes part of the column. Typically, the tube bundle is oriented horizontally. Water or a heat transfer fluid passes through the tubes to remove heat from the tall oil vapors and noncondensible gases. In some tall oil columns, the tall oil vapors pass through the inside of the tubes with the cooling medium on the outside of the tubes. In this instance, the tube bundle may be oriented vertically. In either case the problem with anthraquinone condensing and solidifying on the surfaces of the tubes can occur and lead to loss of heat transfer and high pressure drop due to the restricted flow of the tall oil vapors through the tube bundle.

Figure 1:
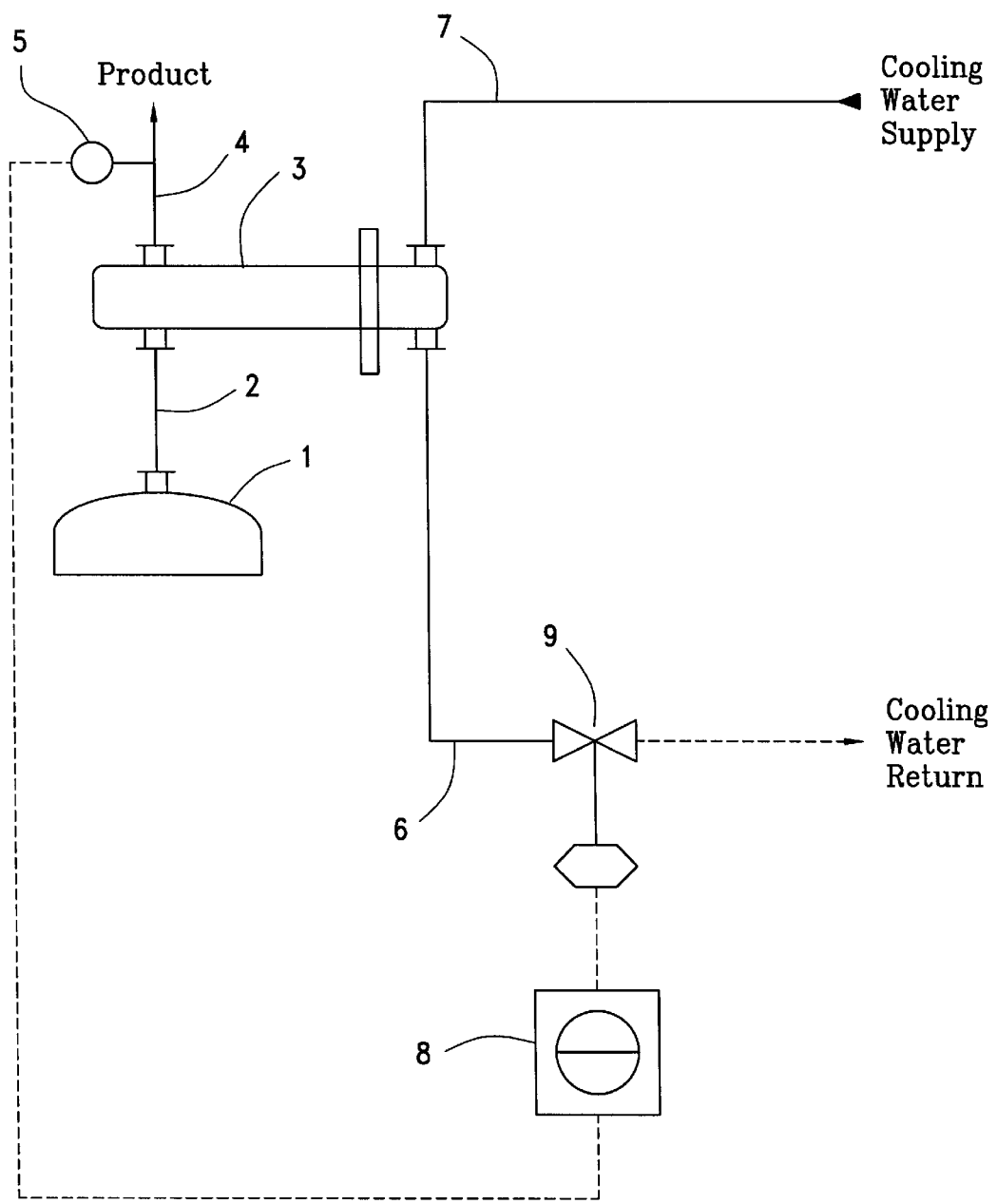
FIG. 1 is the process flow diagram of an indirect contact cooling and condensing zone of the tall oil distillation column showing the routing of a cooling water supply therethrough.
Figure 2:
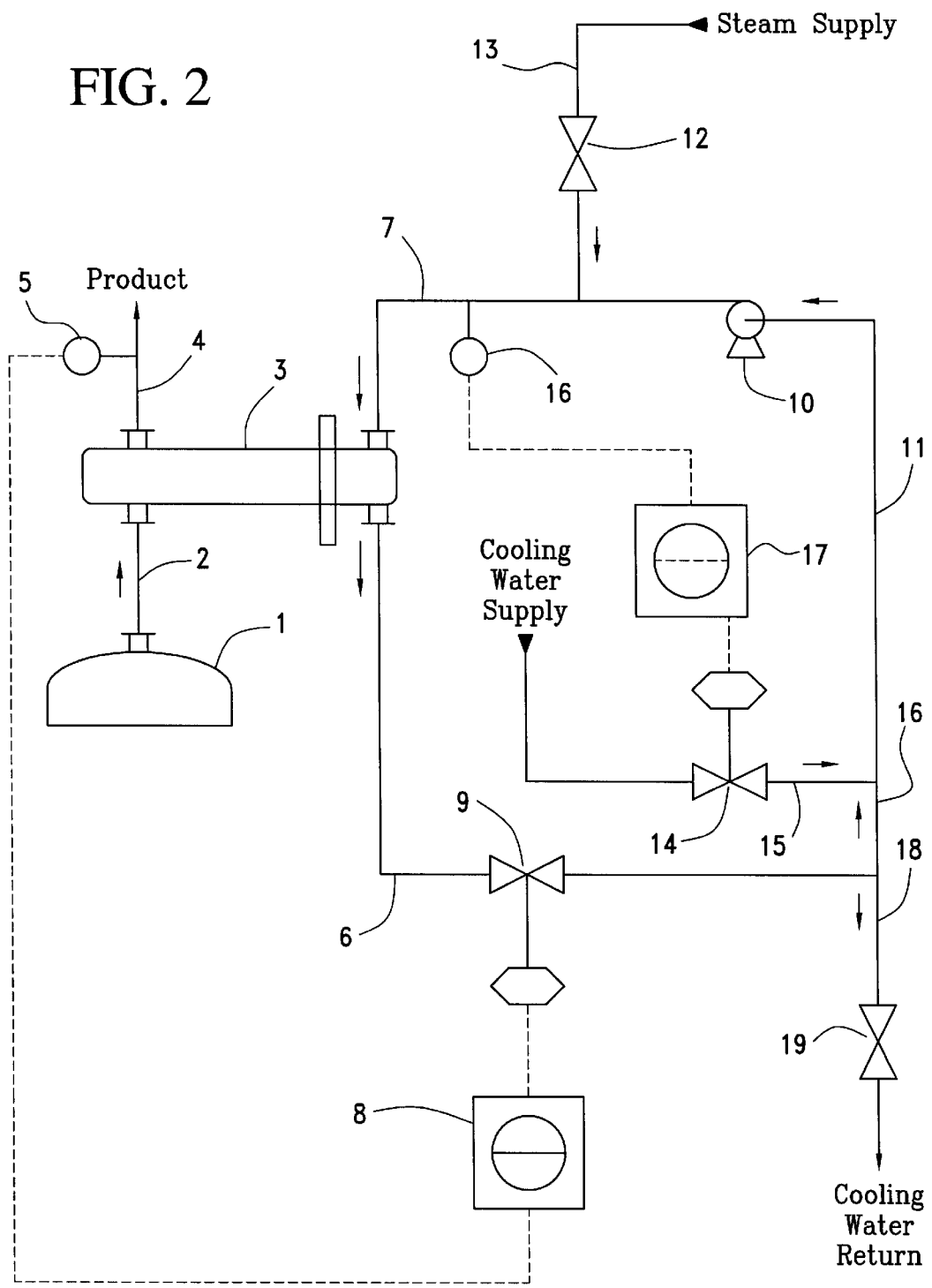
FIG. 2 is a process flow diagram of the invention improvement showing the heads cooling loop of a tall oil distillation process using a tempered water system with an indirect contact condenser.

The invention is best described with references to FIGS. 1 and 2.

FIG. 1 shows the conventional cooling water loop through an indirect contact heat exchanger 3, causing fouling and loss of heat transfer and increased pressure drop due to restricted flow. Before the invention modification, cooling water is supplied through line 7 to the water-side of heat exchanger 3, which in FIG. 1 is the tube-side of the exchanger, to remove heat from the process stream 2. Flow of the water leaving heat exchanger 3 into the cooling water return is regulated by control valve 9 in line 6. Temperature sensing element 5 senses the temperature of process stream 4 and transmits a signal to temperature controller 8, which then transmits a signal to control valve 9 so that the temperature of the process stream 4 leaving heat exchanger 3 remains at the desired value.

The invention improvement solution is described with reference to the process flow diagram of FIG. 2, which shows a process flow diagram for a tall oil distillation column with an indirect contact condenser connected in series with the column. The condenser is depicted as a horizontal, shell-and-tube heat exchanger with the tall oil vapors passing over the outer surfaces of the tubes. There is shown a warm-water loop for the tube-side flow of tempered water to prevent anthraquinone from fouling the outer surfaces of the exchanger tubes and causing a loss in heat and increased pressure drop.

The tall oil vapors and noncondensible gases pass from the tall oil distillation column 1 by means of line 2 and enter heat exchanger 3, which may be of the shell-and-tube type shown in FIG. 2 or it may be of another suitable type of construction, including plate-and-frame, spiral, or other design. The process stream 2 may be on the shell side of the exchanger 3 with the water flow within the tubes as shown in FIG. 2 or the process stream may be on the tube side with water flow on the shell side. Exchanger 3 may be a single exchanger as shown in FIG. 2, or there may be more than one exchanger and these exchangers may be connected in series or in parallel or in combination of series and parallel. Exchanger 3 also can be an integral part of column 1.

After being cooled to the desired temperature in exchanger 3, the process stream exits through line 4. The cooled process stream 4 may be withdrawn as product, or it may pass through to downstream equipment not shown in FIG. 2, such as a vapor-liquid separator, another heat exchanger, or a vacuum system. Pump 10 circulates the warm water through line 7 into exchanger 3 to remove heat from the process stream 2. Cold water enters line 11 of the warm-water loop from the cooling water supply by means of control valve 14 and line 15. The amount of cold water entering is controlled by temperature controller 17, which senses the temperature of the circulating warm water from a signal transmitted from temperature sensing element 16. The temperature controller 17 transmits a signal to control valve 14 so that the temperature of warm water stream 7 entering exchanger 3 remains at the desired value. Steam is supplied to the warm water circulating through the loop, primarily during start-up, shutdown, or upsets when there may not be sufficient heat rejected from the process stream to maintain the desired temperature in the warm-water loop. Excess warm water is let out of the warm-water loop by valve 19 and line 18 into the cooling water return. The balance of the warm water is returned by line 11 to pump 10. Flow of the warm-water loop is regulated by control valve 9 in line 6. Temperature sensing element 5 senses the temperature of process stream 4 and transmits a signal to temperature controller 8, which transmits a signal to control valve 9 so that the temperature of the process stream 4 leaving exchanger 3 remains at the desired value.

By such described means of tempering the cold, or cooling, water prior to its entering the heat exchanger for the tall oil distillation process stream, condensation and solidification of residual anthraquinone (from the pulp digestion process) remaining in the CTO is avoided.

Modifications to this invention will occur to those skilled in the art. Therefore, it is to be understood that this invention is not necessarily limited to the particular embodiments disclosed; rather, it is intended to cover all modifications which are within the true spirit and scope of this invention, as disclosed and claimed herein.

What is claimed is:

1. An improved process for refining crude tall oil produced by a wood pulping process employing anthraquinone as a pulping additive comprising fractionating the crude tall oil by using at least one heat exchanger and at least one refinery tower with an upper cooling zone to remove a pitch fraction therefrom and separating the remaining crude tall oil into a distilled tall oil fraction, tall oil rosin fraction, tall oil fatty acids fraction, and heads fraction whereby the heads fraction exiting the upper cooling zone forms a process stream directed through the heat exchanger and wherein the anthraquinone condenses in the cooling zone and solidifies in the heat exchanger and wherein water is used to cool the process stream, wherein the improvement comprises a method of reducing or eliminating said anthraquinone condensation and solidification in an indirect contact heat exchanger by controlling the temperature of the water circulating therethrough within a range from about 60° to about 210° F. and wherein the water cools the heads fraction by its circulation through one side of the heat exchanger via a cooling water loop to remove heat from the heads fraction which circulates through an opposing side of the heat exchanger wherein the temperature of the water in the cooling water loop is controlled by temperature sensors that turn on and off valves that, when turned on, permit injection of steam into the cooling water loop.

2. The improved process of claim 1 wherein the water temperature is controlled within a range from about 170° to about 190° F.

3. The improved process of claim 2 wherein the temperature of the water circulating in the cooling water loop is controlled by releasing water above 190° F. from the cooling water loop and injecting into the cooling water loop water below 170° F.

4. The improved process of claim 1 wherein the heat exchanger is selected from the group of heat exchangers consisting of shell-and-tube, plate-and-frame, and spiral.

5. The improved process of claim 4 wherein the heat exchangers are connected in a configuration selected from the group of configurations consisting of in series, in parallel, and a combination thereof.

6. The improved process of claim 1 further comprising multiple heat exchangers.

7. The improved process of claim 1 wherein the temperature of the water circulating in the cooling water loop is controlled by releasing water above 210° F. from the cooling water loop and injecting into the cooling water loop water below 60° F.

* * * * *